UNITED STATES PATENT OFFICE.

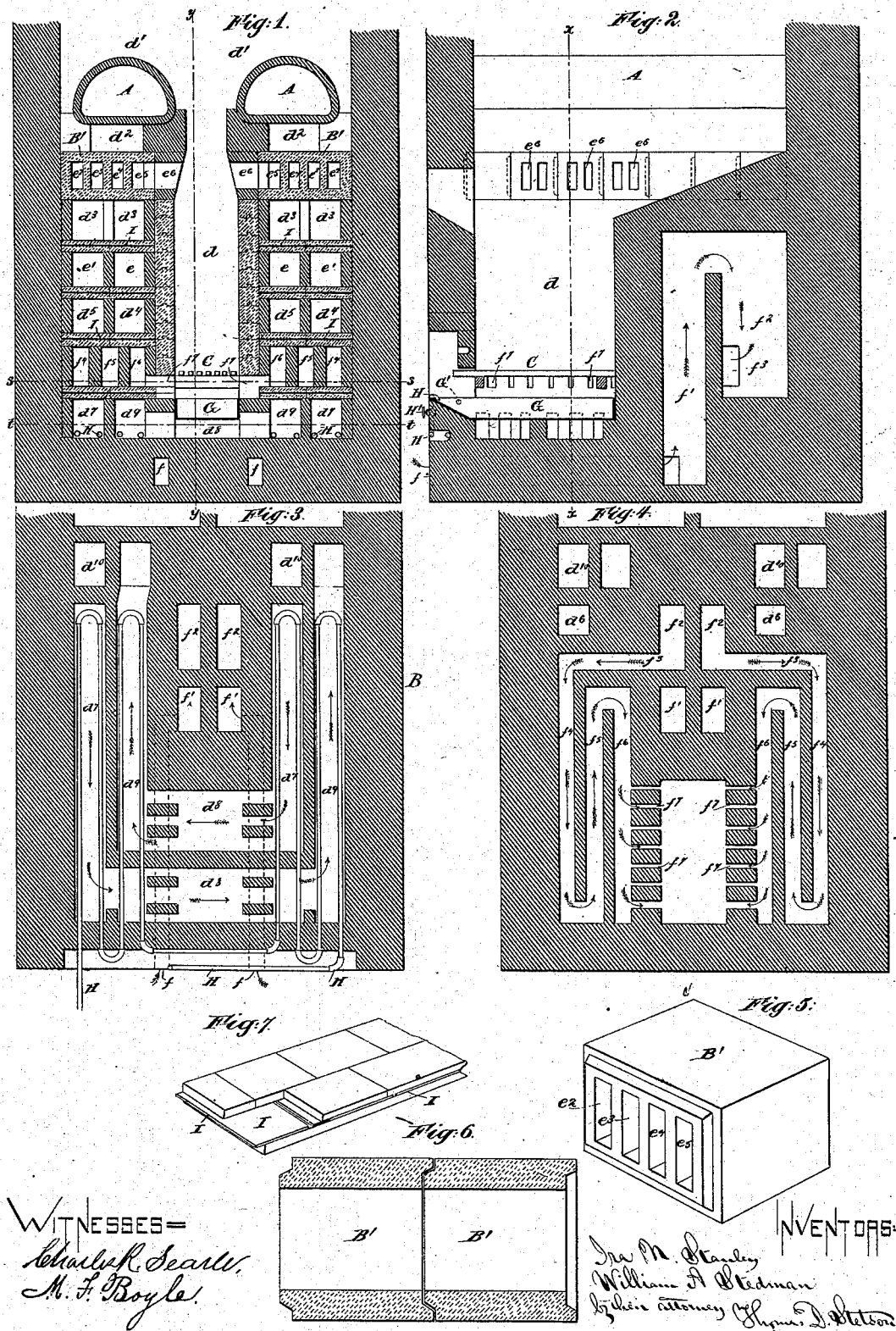

IRA N. STANLEY, OF BROOKLYN, NEW YORK, AND WILLIAM A. STEDMAN, OF NEWPORT, RHODE ISLAND.

GAS-RETORT FURNACE.

SPECIFICATION forming part of Letters Patent No. 293,107, dated February 5, 1884.

Application filed October 2, 1883. (No model.)

*To all whom it may concern:*

Be it known that we, IRA N. STANLEY, of Brooklyn, Kings county, in the State of New York, and WILLIAM A. STEDMAN, of Newport, in the county of Newport and State of Rhode Island, have invented certain new and useful Improvements in Gas-Retort Furnaces, of which the following is a specification.

The invention applies to benches containing any number of retorts. We utilize the heat of the escaping gases to heat the incoming air and water.

The invention relates to means for heating the air which is supplied to the furnace through the grate, thereby adding materially to the economy; to means for warming water which is exposed in a pan below the grate, thereby increasing the measure of steam to mingle with the air for combustion, and keeping a cleaner and brighter fire; means for warming the water by traversing it through pipes exposed to the hot gases before its admission to the pan, thereby further increasing the volume of steam; the arrangement of flues at the back of the furnace for utilizing that space as an air-warming chamber; the employment of peculiarly-chambered tiles to form the passages for the air in the last part of its course, where it is most highly heated, thereby reducing the number of joints; and the employment of thin iron as a means for sealing joints in the several flues, and increasing the durability and efficiency of the apparatus.

The following is a description of what we consider the best means of carrying out the invention.

The accompanying drawings form a part of this specification.

Figure 1 is a vertical section on the line $xx$, Fig. 2. Fig. 2 is a vertical section on the line $yy$, Fig. 1. Fig. 3 is a horizontal section on the line $tt$, Fig. 1. Fig. 4 is a horizontal section on the line $ss$ in Fig. 1. The remaining figures show portions on a larger scale. Fig. 5 is a perspective view of one of the perforated tiles which we employ to form certain air-passages in the last and hottest portion of the air traverse. Fig. 6 is a vertical section through two of these tiles. Fig. 7 is a perspective view, showing the arrangement of the tiles forming the horizontal partitions between certain flues, and a portion of one of the plates of iron which we employ to seal the joints.

Similar letters of reference indicate like parts in all the figures where they occur.

Referring to the drawings, A A are retorts, only two of which are shown. It will be understood that there are others, at a higher level, arranged in any ordinary or suitable manner, to allow the gas from the furnace to bathe them while at their highest temperature, and impart to them the intense heat necessary to the rapid and economical production of gas. The retorts may be charged and emptied and the gas taken away, purified, and stored, as usual.

B indicates the brick-work, considered generally. Certain portions are designated by additional marks, as B'.

C is a grate, composed, as usual, of rectangular bars capable of being separately shaken or withdrawn by operating at their protruding front ends.

A considerable space for fuel and products of combustion—which we term the "furnace"— is marked $d'$. The intensely-heated gases rise from this furnace and circulate through the space $a'$ around and between the retorts A; thence they divide and, descending, traverse backward and forward, and impart their heat to the incoming air in flues arranged each side of the furnace. The two sides are similar each to the other. A description of one side will suffice for both. The hot gases are received and move forward in a flue, $d^2$, under the lower retort; thence they descend at the front through a passage, (not shown,) and move backward through a divided flue, $d^3$, at the rear, descend through a passage, (not shown,) and come forward through a single flue, $d^4$. Near the front they are transferred through an aperture and move backward through a flue, $d^5$. Down to this point the constructions on the two sides of the furnace are exact counterparts of each other; but from this point onward there are differences in the two sides. We will describe both together. At the rear they descend through passages $d^6$, one on each side, (see Figs. 3 and 4,) and move forward through passages $d^7$. (See Figs. 1 and 3.) At the front each moves across from one side of the apparatus to the other through broad passages $d^8$, and thence move backward to passages $d^9$, and are discharged into flues or uptakes $d^{10}$, which communicate with the stack, (not represented,) and conduct the gases away. On the right-hand side of the bench the flue $d^7$, which comes forward, is innermost, or lies next to the thick wall of the furnace. The transverse passage $d^8$, which carries the gases from the right-hand side of the bench, traverses across under the rear of the furnace, and the corresponding flue, $d^9$, which carries away the gases, is innermost on the left side. On the left-hand side the passage $d^7$ is exterior next to the outer wall of the bench. The connecting-passage $d^8$, which carries the gases across from the left side, is under the front end of the furnace, and the passage $k^9$ on the right-hand side is outside next to the wall of the furnace. It carries the gases which are received from the left-hand side backward, and discharges them into the flue through the uptake $d^{10}$ on the right-hand side. By this transference of the gases across under the furnace we secure heat for evaporating water, as will appear further on. All these flues are made of sufficient area and allow the gases to move freely. With a good draft we experience no difficulty in traversing the gases through this circuitous route, and also in drawing in the air to the furnace through the several sets of air-passages to be now described. In each side of the top of the furnace we supply fresh air intensely heated to complete the combustion of the gases rising from the furnace. We heat the air for this purpose by closely associating other flues with the flues containing the products of combustion at a high heat. In each side of the space below the grate, sometimes denominated the "ash-pit," we supply the air moderately heated to move up through the grate and support the combustion of the coke resting thereon. The combustion of this coke proceeds in the ordinary manner, except that it receives air warmed by close association with the products of combustion at a late stage when their temperature is somewhat lowered.

The provisions for heating the air to be introduced to the gases above the fire resemble the construction set forth in the patent to us dated May 16, 1883, No. 257,901. The air is received from the external atmosphere at the front, moves backward through the horizontal flue $e$, is transferred at the rear to a parallel flue, $e'$, in which it comes forward. It rises at the front and enters the outermost of a series of parallel passages which are formed by peculiarly-constructed tiles B'. Each tile is of the proper size and form to extend from the furnace-wall, where it begins to contract at the top, to the exterior wall of the bench. Each is provided with rectangular passages, and the end which is presented against the furnace may be open to allow the air to be discharged into the furnace. The motion of the gases in these passages across these tiles will be readily understood. It is received through an uptake at the front from the flue $e'$ into a passage, $e^2$, which leads it backward. At the back it is transferred into the parallel passage $e^3$, which leads it forward. It is transferred at the front into the passage $e^4$, which carries it backward; thence it is transferred at the rear into the passage $e^5$, which brings it forward; thence it is discharged through the lateral openings at $e^6$ into the furnace, where it mingles with the gases and supplies oxygen to complete the combustion and further intensify the heat. Entirely distinct from the passages which heat the air to be thus received above the fire are the series of passages $f f'$, &c., which heat the air to be discharged into the ash-pit and come up through the grate. These flues also, on the two sides, are the reverse of each other, so as to exactly correspond. The air is received on one side from the external atmosphere at a low point in the front. It traverses rearward through the flue $f$. (Shown in Fig. 1, and in dotted lines in Fig. 3.) Each passage $f$ pours its air into a considerable vertical chamber, $f'$. (See Figs. 2, 3, and 4.) The top of this chamber communicates, as shown in Fig. 2, with another vertical chamber, $f^2$, in which it descends. The bottom of $f^2$ discharges its air through a lateral flue, $f^3$. (See Fig. 4.) Thence it traverses forward through $f^4$, backward through $f^5$, and forward through $f^6$. From the latter it is discharged into the ash-pit or space below the grate through a series of orifices, $f^7$. These passages divide the air into a series of narrow streams favorably conditioned for absorbing and mingling with the vapor rising from the heated water below, and the mixture of warm air and steam rises through the grate.

G is an open-topped vessel or pan, of wrought-iron or other suitable material, kept partially filled with water. The products of combustion, in traversing across from one side to the other of the apparatus, (see Fig. 2,) are presented to and bathe the under side and a part of the vertical sides of this pan. The water is supplied to the pan G through a pipe, H, which traverses backward and forward in the several flues $d^7 d^8 d^9$. A valve, H', controls the flow of the water through this pipe from an elevated reservoir or other convenient source. (Not represented.) The water becomes heated in traversing the several convolutions of the pipe H, and when at the end the pipe rises and discharges it inward over the edge of the pan G, it should be nearly or quite up to the boiling-point. If the heat received during its passage through the pipe H shall be somewhat in excess of this, and shall generate even a considerable quantity of steam which shall pour in mingled with water, no harm will result. The steam will separate at the mouth of the pipe and add directly to the quantity mingling with the air and going up through the grate, while the water will fall into the pan, and, being at the boiling-point, initiate a high temperature, which makes it easier for the hot gases traversing under the pan to subsequently evaporate the whole.

G' is an overflow-pipe, which discharges the water in some manner, so as to direct attention in case the cock H' shall be opened too widely. The air traversing in the several air passages or flues receives heat mainly from the hot gaseous products of combustion traversing the several flues which are intimately associated or sandwiched therewith. The air, in ascending through the chambers $f'$ and descending through $f^2$, receives heat from the several flues $d^3$ and $d^5$ which traverse the sides. Some heat is also transmitted by conduction from the furnace to the air in all the flues, passages, or chambers; but the walls immediately surrounding the furnace should be so thick that the heat of the gases rising from the furnace will not be appreciably lowered by such conduction. The construction of the layer of air-flues $e^3$ $e^4$ $e^5$ $e^6$ from tiles extending continuously from the side of the furnace-wall to the exterior of the bench goes far to promote the durability of the apparatus. These flues are at the point of the highest heat. They receive the air already raised in temperature by its previous passage through the flues $e'$ $e^2$. Their upper edges are exposed to the hottest flue, $d^2$. Their lower edges are exposed to the flues, $d^3$, where the gases are still very hot. To produce these flues $e^3$ $e^4$, &c., by separate bricks would greatly increase the risk of the joint becoming open. It is important to maintain these flues in as tight a condition as possible. The tile having apertures which match to form the flues greatly reduces the number of the joints.

Devices for a similar purpose have been produced, in which the furnace is located outside of the bench, in which cold air is admitted directly to the steam over the water-pan. The mixture thus obtained is then heated and the same gases carried forward and back. Our invention is different, in that we heat our air first, so that it will rather tend to superheat the steam. We admit our air at a point below all the flues and allow the air to take heat from the brick-work without affecting the heat of the retort. We pass different currents of hot gas in opposite directions under the pan, and we locate our furnace within the bench. The abutting faces of the tiles B' are made to match into each other a little, (see Figs. 5 and 6,) which aids to keep the apertures through them in perfect line, so as to form smooth and continuous passages. At the joints between the flat tiles forming the horizontal partitions between flues we insert thin wrought-iron I. (See Figs. 1 and 7.) This is embedded in the fire-clay in which the tiles are laid.

We have in our experiments used iron plates something less than a sixteenth of an inch thick. Being protected from access of the air, they will withstand the high temperature for a long period. Probably the material will remain and perform a useful function in aiding to make the joints tight even after a slight crack shall have reached them and allowed the part immediately adjacent thereto to become oxidized.

Modifications may be made in the forms and proportions. Parts may be used without the whole. The front of the pan G is inclined, as shown, and the covering of that portion may be removable to facilitate the taking away of cinders and ashes which may fall from the grate into the water.

We deem the water-pan important in combination with provisions for heating the air, for the reason, among others, that it insures a relatively blank surface below to prevent overheating the grate. The incandescent fuel above communicates heat to the grate-bars, which a current of cold air rising through the grate enables it to endure. When the air supplied to the grate is heated, it increases the risk of the grate becoming overheated. Under some circumstances, as when a grate is freshly shaken and fine glowing cinders have been deposited, the grate is liable to sink. The water-pan, by receiving and extinguishing the cinders, aids to maintain the moderate degree of heat which the grate can endure.

We attach importance to the provisions for heating the water and maintaining a nearly equable flow of hot air and steam to supply the fire.

Automatic means, as a float in the pan G, may be provided for regulating the reception of water; but the conditions are so unfavorable for delicate apparatus that we prefer to regulate in ordinary cases by hand.

Having now fully described our invention, what we claim as new, and desire to secure by Letters Patent as our improvement in a bench of gas-retorts, is—

1. In combination with the combustion-chamber and ash-pit, substantially as described, the series of hot-gas flues $d^2$ $d^3$, &c., leading to the chimney and embracing the cross-flue $d^8$, connecting the flues $d^7$ and $d^9$, as shown, the air-flues $e'$ $e^2$, &c., alternating with the hot-gas flues and connecting with the upper part of the combustion-chamber $d$ and the air-flues $f'$ $f^2$ $f^3$, &c., alternating with the hot-gas flues and connecting with the ash-pit, as and for the purposes set forth.

2. The open or uncovered water-pan G, exposed directly to the radiant heat from the fire above, and arranged to present its contents directly to currents of previously-heated air flowing to the grate, in combination with the two flues $d^8$ and independent connections therefrom conducting separate streams of hot products of combustions in opposite directions under the pan, as herein specified.

3. In a gas-furnace, substantially as described, the combination of the water-pipe H and controlling means H', and the water-pan G, with the flues $d^7$ $d^9$ and their connections $d^8$ with each other, as and for the purposes set forth.

4. In combination with the furnace, the hot-air flues $d^2$ $d^3$, &c., and the series of air-flues $e'$ $e^2$ &c., arranged as described, the flues $d^7$ and $d^9$, connected by the flues $d^8$, the air-flues $f f^4 f^5 f^6$, &c., having the vertical flues $f' f^2$, as set forth.

5. The series of chambered tiles B', arranged with their apertures connecting to form air-flues, in combination with the hot flues $d^2 d^3$, and with the flues $e' e^2$, bringing partially-heated air, and arranged to discharge the air intensely heated into the furnace, substantially as herein specified.

6. The metallic joint-plates I, in combination with suitable tiles, arranged to break joints with the tiles and to aid in preventing any flow of air through the joints, substantially as herein specified.

7. In a gas apparatus, the flues $d^2 d^3$, &c., for conducting hot gaseous products of combustion, flues $e' e^2$, &c., for conducting fresh air near the former, so as to be heated thereby, water-pan G, with provisions for heating it to generate steam, and a fire-grate, C, supporting the fuel for combustion, arranged substantially as shown, whereby previously-heated air from the flues $e'$, &c., mingles with the steam and the mixture is drawn directly through the grate, all substantially as herein specified.

In testimony whereof we have hereunto set our hands, at New York, N. Y., this 24th day of September, 1883, in the presence of two subscribing witnesses.

IRA N. STANLEY.
WM. A. STEDMAN.

Witnesses:
CHARLES R. SEARLE,
M. F. BOYLE.